Feb. 27, 1934.    J. H. MILLER    1,948,729
RADIO SET TESTING APPARATUS
Filed July 8, 1931    5 Sheets-Sheet 1
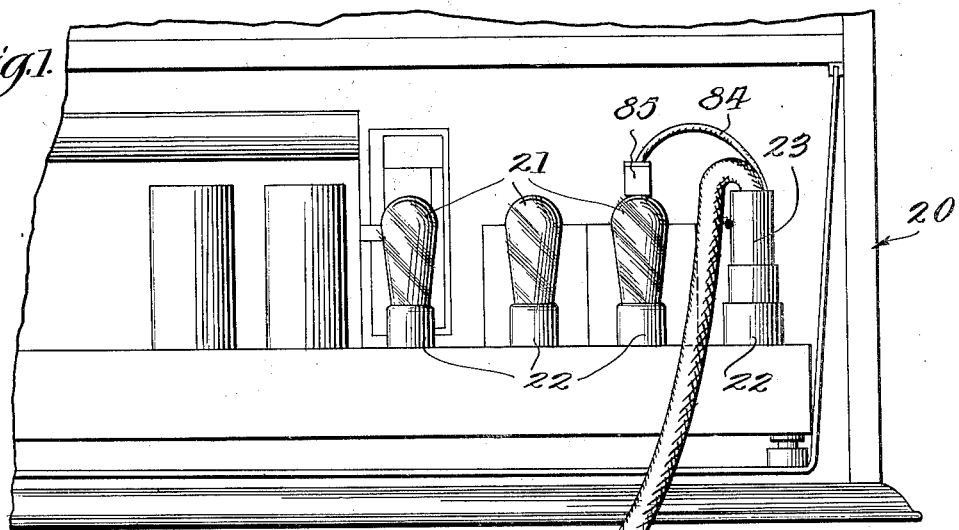
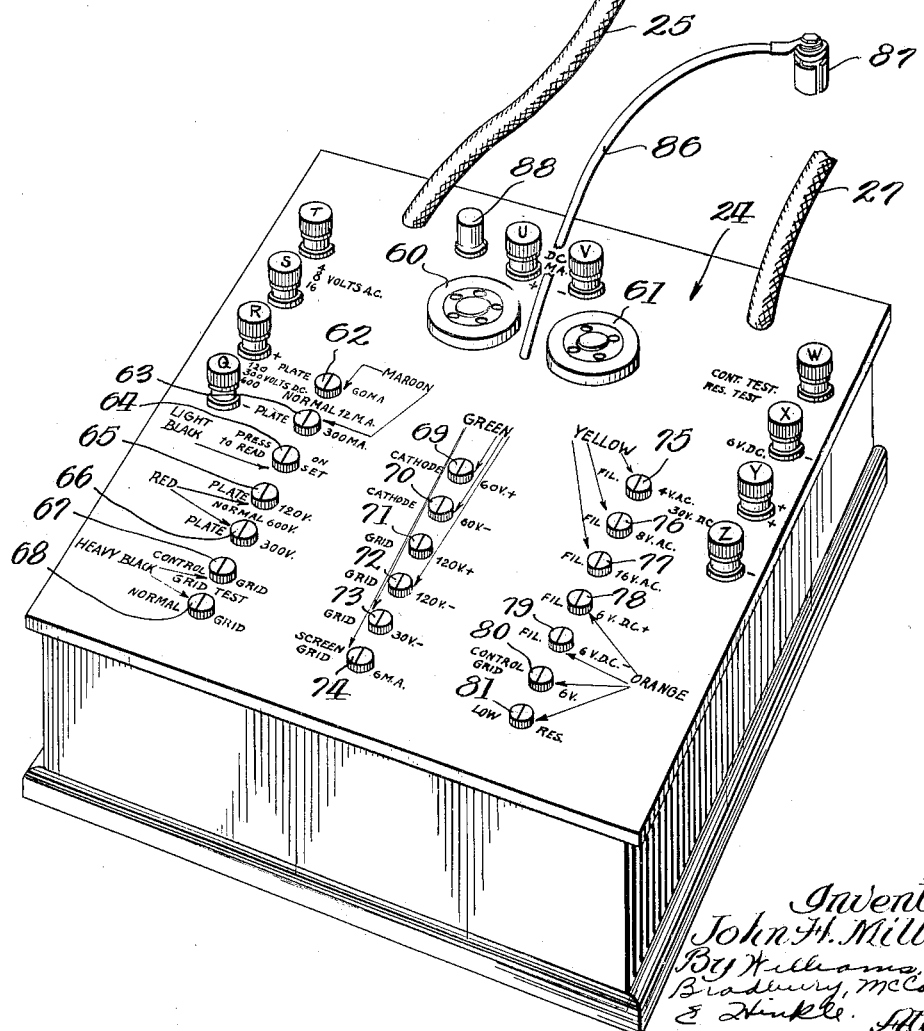

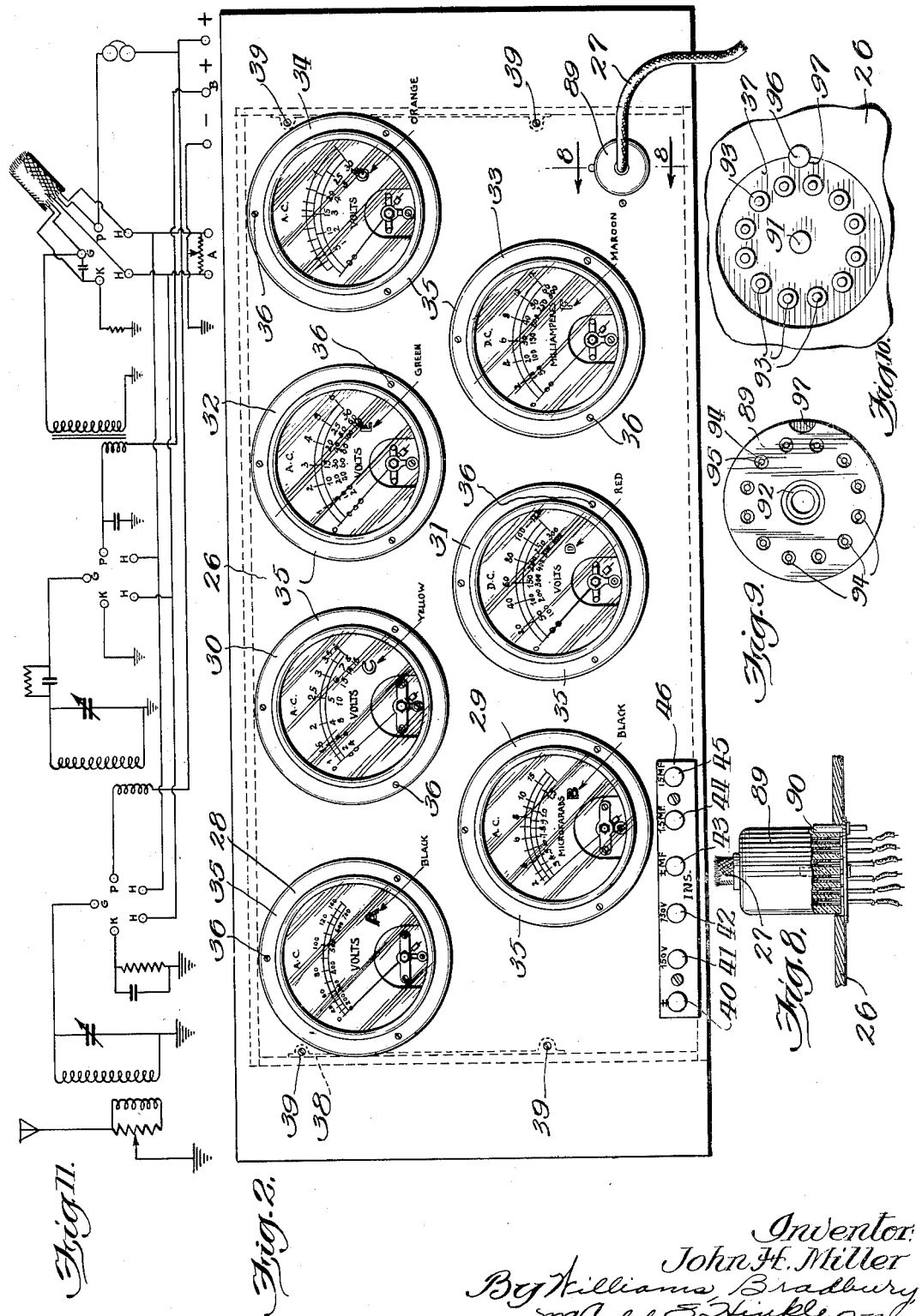

Feb. 27, 1934.  J. H. MILLER  1,948,729
RADIO SET TESTING APPARATUS
Filed July 8, 1931  5 Sheets-Sheet 3
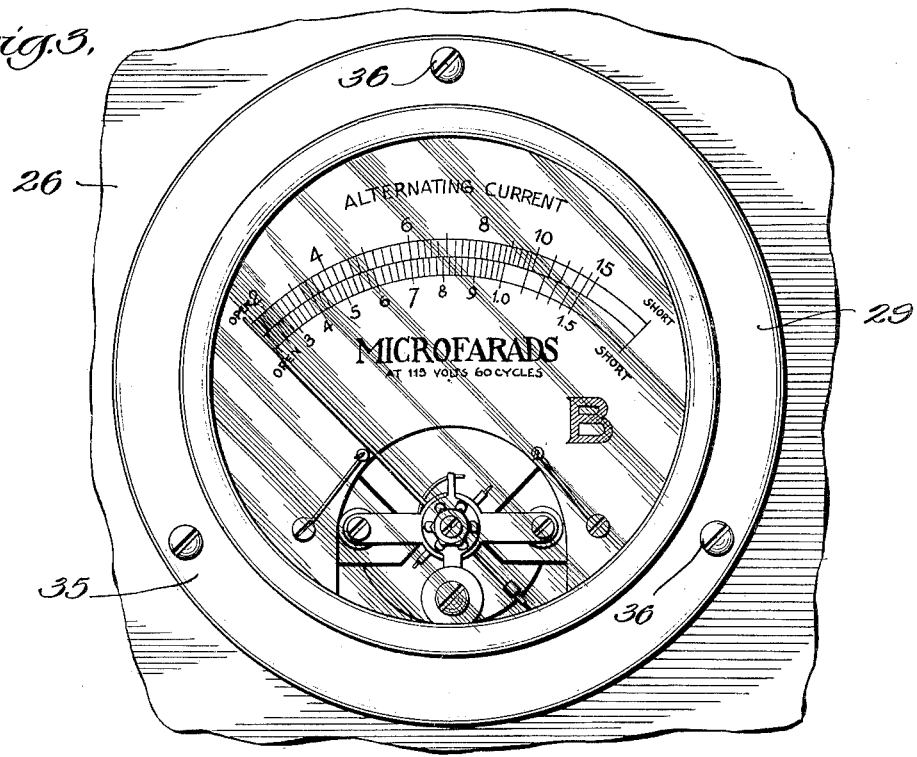
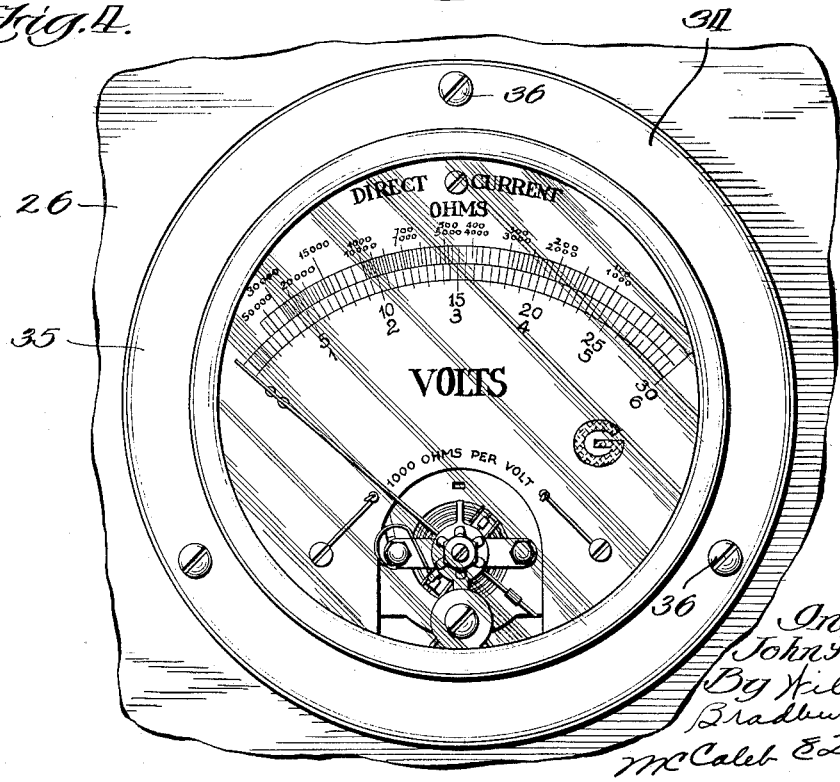

Feb. 27, 1934.  J. H. MILLER  1,948,729
RADIO SET TESTING APPARATUS
Filed July 8, 1931   5 Sheets-Sheet 4

Inventor:
John H. Miller
By Williams, Bradbury,
McCaleb & Hinkle
Attys.

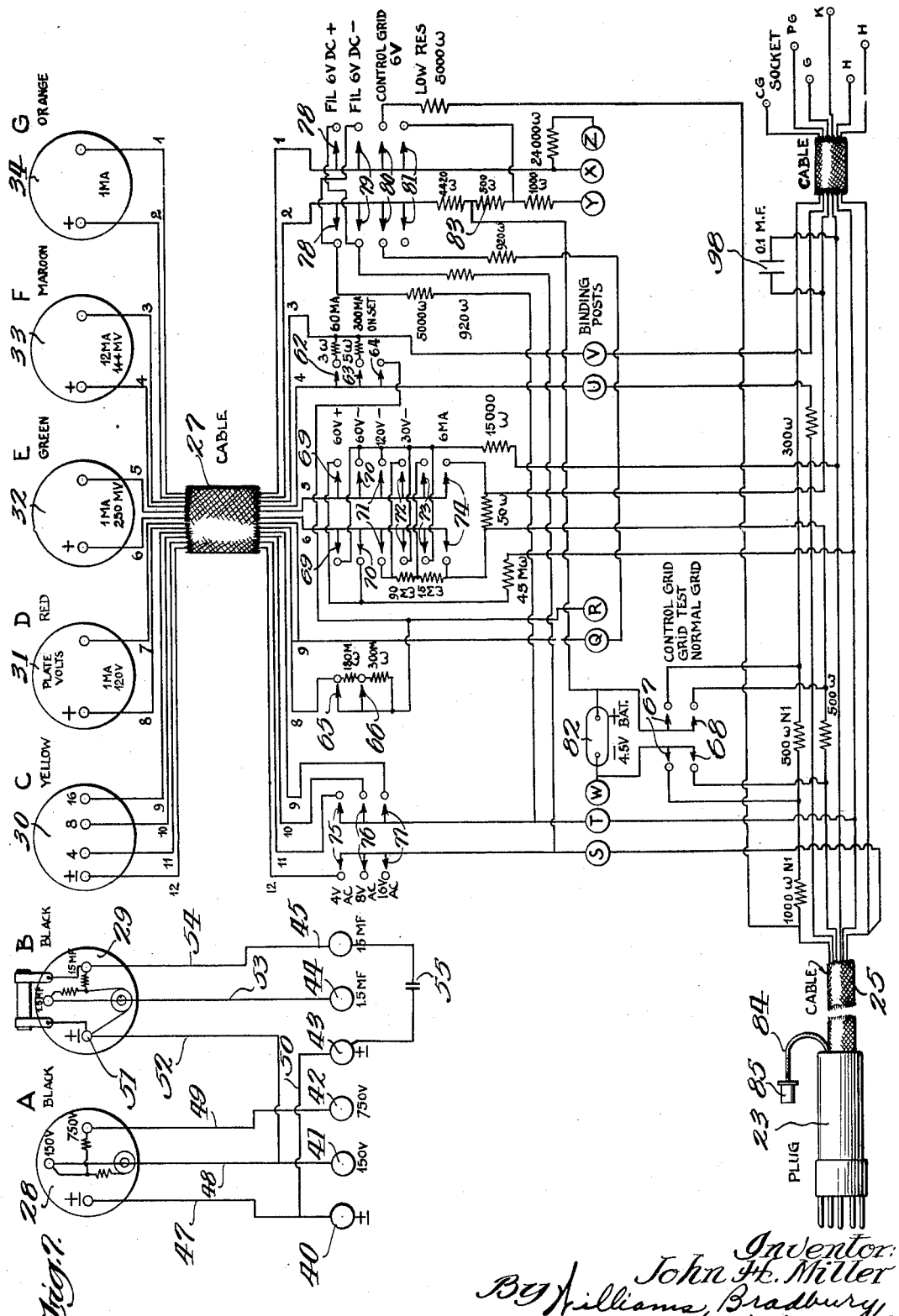

Patented Feb. 27, 1934

1,948,729

UNITED STATES PATENT OFFICE 1,948,729

RADIO SET TESTING APPARATUS

John H. Miller, Oak Park, Ill., assignor to Jewell Electrical Instrument Company, Chicago, Ill., a corporation of New Jersey Application July 8, 1931. Serial No. 549,356

6 Claims. (Cl. 250—20)

The present invention relates to radio set testing apparatus, and is particularly concerned with apparatus for servicing radio receiving sets and similar electronic amplifying apparatus. It should be understood, however, that the apparatus is of general application and may also be used for testing audion tube circuits and radio apparatus of all kinds, such as thermionic tubes, circuits, transformers, condensers, coils, resistances, batteries, lightning arresters, and all types of electrical units.

It should also be understood that all of the features of the present invention need not be included in every embodiment of the invention, and many of the novel features of the present testing equipment may be used separately from the complete testing apparatus. The smaller or more simple testing devices constructed according to the present invention need only include such improved features as it may be desirable to include in the lower priced testing devices, which are adapted only for performing a limited number of tests.

Modern radio receivers and radio apparatus have become so complex in structure and circuit arrangement, that the location, analysis and correction of trouble in a radio receiver has become an extremely difficult art, even for those who are skilled in the construction of receivers. The users of radio receivers have also become accustomed to higher standards of performance in radio receivers, and better tone quality, greater selectivity, greater sensitivity, better volume control and better standards of performance are now required.

The maintenance and servicing of modern radio receivers therefore necessitates the use of improved testing devices for locating the trouble in radio receivers, or for checking the electrical conditions existing in the receiver and assuring a high standard of performance.

One of the objects of the invention is the provision of an improved apparatus for testing radio receivers and the like, of the panel type, adapted to be permanently installed in radio shops, factories or laboratories.

Another object is the provision of an improved remote control, for the selective switching devices, by means of which the various electrical instruments may be more conveniently controlled by an operator who is working adjacent the radio receiving set, without the necessity for moving back and forth from the panel to the set.

Another object is the provision of an improved selective switching arrangement utilizing different colors for the different switches or push buttons associated with instruments also bearing colored indicia, so that the selection of the switch and the proper instrument is expedited and the test may be carried on more efficiently than is possible with the devices of the prior art.

Another object is the provision of an improved circuit arrangement for testing audion tubes and circuits.

Another object is the elimination of the tendency toward oscillation, which is noted when testing devices of this type are used with modern radio receiving circuits, and the provision of an improved adapter whch has the capability of preventing oscillation.

Another object of the invention is the provision of an improved capacity meter arrangement for directly indicating the capacity of condensers used in radio receiving circuits.

Another object is the provision of an improved resistance measuring arrangement for directly indicating the resistance of parts of a radio receiver without the necessity for calculation.

Another object is the provision of an improved radio set testing apparatus which is more efficient, more compact, more accurate and more durable than the devices of the prior art, by virtue of the improved structure and arrangement of the parts of the apparatus.

Other objects and advantages of the invention will be apparent from the following description and from the accompanying drawings, in which similar characters of reference indicate similar parts throughout the several views.

The present apparatus is an improvement of the portable apparatus disclosed in my prior application, Serial No. 526,158, filed March 30, 1931, and the methods of testing audion tube circuits and devices disclosed in that application may also be carried out by the present apparatus.

Referring to the drawings, of which there are five sheets;

Fig. 1 is a diagrammatic view of the remote control box and a radio receiver, which is being subjected to test;

Fig. 2 is an elevational view of the panel and instruments which are utilized with the apparatus of Fig. 1;

Fig. 3 is an elevational view of the capacity meter used on the panel of Fig. 2;

Fig. 4 is an elevational view of the resistance meter utilized in the apparatus of Fig. 2;

Fig. 7 is a diagrammatic illustration of the circuits and instruments utilized in the present testing apparatus;

Fig. 8 is an elevational view in partial section, of the connection plug for the cable leading from the remote control box to the panel;

Fig. 9 is an end view of the plug of Fig. 8;

Fig. 10 is a plan view of the male connector shown in section in Fig. 8, and carried by the panel of Fig. 2;

Fig. 11 is a wiring diagram of an exemplary audion tube circuit in which the improved adapter of Fig. 6 is capable of eliminating the tendency toward oscillation.

Figure 6:
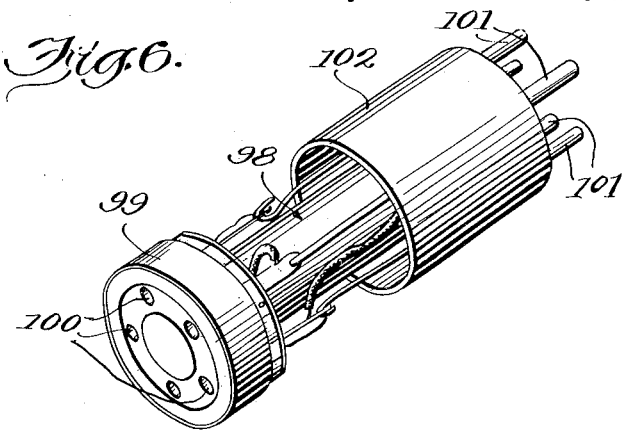
Fig. 6 is a view in perspective of an improved adapter, with the parts of the cover separated to show the internal structure.

Referring to Figs. 1 and 2, 20 indicates in its entirety a radio receiving set, the circuits of which includes a plurality of audion tubes 21 carried by conventional sockets 22. The present apparatus is capable of testing practically every type of modern radio receiving set, including screen grid tubes, and the apparatus includes all of the auxiliary equipment leads and adapters which are described in my prior application above mentioned.

The apparatus is illustrated in Fig. 1 in connection with the receiving set 20, one of the tubes 21 having been removed, and the test connector or plug 23 having been inserted in the corresponding tube socket 22.

The present testing apparatus preferably includes the remote control box 24 with a cable 25 connecting the remote control box and the test connector 23 and an instrument panel 26 with a cable 27 connecting the remote control box 24 and the panel 26. The panel 26 is adapted to be mounted above a bench or any other convenient place in a laboratory, and is preferably provided with instruments having sufficiently large dials and indicia so that they can be seen at a distance, while the remote control box 24 is preferably located at a distance from the panel and adjacent the radio receiving set being tested, so that the operator may carry on all of the tests by means of the selective switches provided, without the necessity for leaving the receiving set and the remote control box, since the instruments may be read at a distance.

Referring to Fig. 2, the panel 26 is preferably provided with a plurality of separate instruments 28 to 34, inclusive, which have been designated by the colored indicia or letters A to G, inclusive, by means of relatively large capital letters appearing on the dial in various colors, for a purpose further to be described.

Each of the instruments preferably consists of a panel type instrument having a radially extending attaching flange 35, which is secured to the panel by screws 36, and the appropriate circuits and conductors for connecting the instruments with the connector 37, are preferably enclosed in a box or casing 38 carried by the back of the panel and secured to the panel by a multiplicity of wood screws 39. The panel preferably consists of a flat piece of sheet metal provided with appropriate apertures for receiving the instruments 28—34, and for the appropriate connectors and screws.

The instrument 28 preferably consists of an alternating current voltmeter having ranges of 150 and 750 volts, for the purpose of measuring line voltage and higher alternating current voltages, which may be encountered in the testing of auxiliary equipment.

The panel 26 is preferably provided with a plurality of binding posts 40 to 45, inclusive, suitably insulated from the metal panel 26 by a strip of bakelite 46, and the binding posts 40—45 are utilized for the instruments A and B, respectively, and provided with appropriate indicia for these meters. Thus, the binding post 40 is the plus and minus or common terminal for the meter 28 or meter A, the binding post 41 is the 150 volt terminal, and the binding post 42, the 750 volt terminal, and the bakelite strip 46 is engraved or grooved with the indicia for each binding post, the grooves being filled with material of a contrasting color, such as white printer's wax.

The meter 29 is fundamentally an alternating current voltmeter which is provided with multiple ranges by means of appropriate resistances, and suitably calibrated with standard values of alternating current to indicate directly the capacity of a condenser which is connected across the terminals of the capacity meter B (29) when appropriate terminals of the voltmeter A are energized from an alternating current source.

Thus, the bakelite strip 46 is provided with terminals 43, 44 and 45 for meter B, 43 being the common terminal bearing the indicia ± M. F. (microfarads), 44 being the other terminal for measurement of capacities up to 1.5 microfarads, and bearing the indicia, "1.5 M. F.", and 45 being the terminal for measurement of capacities up to 15 microfarads, and bearing the indicia "15 M. F.".

The meter B (29), is provided with appropriate scales bearing the words "Open" at the left end of the scale and the word "Short" at the right end of the scale, and indicia with appropriate scale divisions for 0–15 microfarads, and 0–1.5 microfarads, and the meter B is calibrated for measurement of capacity in microfarads at 115 volts, 60 cycles, an appropriate notation to this effect appearing on the meter.

Referring to Fig. 7, it will be noted that the wiring diagram for meters A and B has no connection with the other parts of the apparatus, and the appropriate terminals of the meter A are connected to binding posts 41, 42 by conductors 47—49. The common terminal 40 of meter A is connected to common terminal 43 by conductor 50, and the common terminal 51 of meter B is connected to the 150 volt conductor 48 by conductor 52. The binding posts 44 and 45 are connected by conductors 53 and 54 to the appropriate 1.5 M. F. terminal, and the 15 M. F. terminal of the B meter, which is fundamentally an ordinary alternating current meter of appropriate range with an auxiliary multiplying resistance for the higher range.

The measurement of capacity of a condenser is effected by connecting the condenser 55 as shown in Fig. 7, with appropriate terminals, such as terminals 43 and 45, for measurement of the capacities of the range of 15 microfarads at the same time, by means of appropriate leads, such as those shown in my prior application. The binding posts 40 and 41 are connected to the ordinary 110 volt lighting circuit, and by tracing the circuits it will be found that the meter B is placed in series with the condenser 55 across 110 volts. The line voltage may be checked by means of the meter A to insure the accuracy and if necessary, calibration curves may be provided so that the correct measurement of microfarads may be attained even though the line voltage be slightly lower or higher.

The indication given by an alternating current voltmeter in series with a condenser, depends upon the amount of voltage impressed on the condenser, the capacity of the condenser, and the frequency of the source of alternating current. The line voltage being constant at 110 volts and the frequency being constant at 60 cycles, the meter B may be accurately calibrated to indicate in microfarads or other appropriate units, the capacity of the condenser 55 which is connected in series with the meter B, and this capacity measuring arrangement is very convenient in checking the capacities of the various condensers used in radio receiving sets and other audion tube circuits.

The meter C (30) is preferably an alternating current voltmeter having ranges of 0-4 volts, 0-8 volts, and 0-16 volts, and this meter is used for measuring alternating current, filament voltages or other alternating current values coming within these ranges.

The meter D (31) preferably comprises a direct current voltmeter having ranges of 0-120, 0-300 and 0-600 volts, which may be utilized for measuring plate voltages and other direct current voltages coming within these ranges.

The meter E (32) preferably consists of a direct current milliammeter and voltmeter having ranges of 0-6 milliamperes, 0-30 volts, 0-60 volts, and 0-120 volts, which may be utilized for measuring screen grid current on the milliampere scale and grid voltage on the voltage scale.

The meter F (33) preferably consists of a direct current milliammeter having scales of 0-12, 0-60 and 0-300 milliamperes, and this meter may be utilized for measuring plate current.

The meter G (34) is preferably provided with scale divisions and indicia for measuring 0-1000 ohms, and 0-50,000 ohms, and the lower scale may consist of 0-6 and 0-30 volts direct current.

All of the instruments are preferably provided with standard zero adjustments, and preferably have a resistance of about 1000 ohms per volt in the case of direct current instruments, thereby facilitating the calculation of the constants of the circuit when these instruments are used.

Referring to Fig. 1, I shall now describe the features of the remote control box 24 which may be located adjacent the receiving set or other electrical apparatus being tested, and utilized to control the connection of the various instruments on the panel.

The remote control box is preferably provided with one or more standard audion tube sockets 60, 61. In the preferred form, the socket 60 is a standard five-hole socket, and the socket 61 a four-hole socket, but the four-hole socket may be eliminated by the use of adapters of the type shown in my prior application.

The remote control box 24 is provided with a multiplicity of selective switching devices, and in the present embodiment, these switching devices consist of separate push buttons for controlling the various meters. In some modifications, the switching devices may consist of one or more rotary selector switches, the contacts of which are classified according to the various functions of the meters. The push button switches have the advantage that it is not necessary to move the switch through all preceding tests to arrive at any predetermined switch contact, and this avoids undesirable strains on the instruments, which would otherwise be caused to indicate the intermediate tests whether they were desired or not.

The push buttons are preferably systematically arranged in groups according to the tests desired, and the push buttons 62, 63 in the upper left-hand corner are intended for use in measuring plate current. In order to facilitate the selection of the proper meter, and to expedite the testing operation, the push buttons are preferably colored, and the meters provided with appropriate indicia of the same color, so that the operator soon becomes accustomed to finding the colored meter corresponding to the colored button, and the operator also readily remembers the functions of the buttons according to their color. Various colors may be employed for different switches, and the present embodiment is merely exemplary of one of the forms in which this feature may be embodied.

The meter F (33) of Fig. 2 is controlled by the push buttons 62 and 63, and the circuits are so arranged that the meter F is normally connected in the plate circuit on the 12 milliampere scale. Between the push buttons 62 and 63, there is a notation, "Normal 12 M. A." and the push button 62 bears the indicia "Plate 60 M. A.", while the push button 63 bears the indicia "Plate 300 M. A.". It will be observed that these indicia correspond to the various scales on the meter F, and both the push buttons 62 and 63 are preferably made some distinctive color, such as maroon, and the letter F which is printed on the meter 33 is also maroon.

All of the push buttons utilized in the remote control box 24 are preferably of the type which may be utilized by merely pushing the button, or they may be secured in the controlling position by pushing the button down and turning it to secure it in place. The physical structure of these push buttons is described in detail in my prior application.

Referring to Fig. 7, this is the wiring diagram of the complete testing apparatus, and the corresponding switches have been indicated diagrammatically and identified with the same numerals. The wiring diagram for the present device embodies substantially the same circuits and features disclosed in the wiring diagram of my prior application above mentioned, and consequently all of the parts of the wiring diagram have not been described in detail, but are shown in Fig. 7.

The next push button 64 is preferably of some distinctive color, such as gray, and the function of this push button is to disconnect the normal circuits of the meters D and F from each other when it is desired to utilize the meters separately.

When this push button 64 is in the upper or released position, there is no connection between the corresponding binding posts of these meters and the meters may be used separately but when the push button 64 is pressed, the circuits are in condition for the use of both meters in testing plate voltage and plate current simultaneously, and the circuits are in the normal relation as found in radio sets.

The next two push buttons 65, 66 are preferably of some distinctive color, such as bright red, which is utilized to indicate plate voltage controls, and these push buttons control the circuits of the meter D (31) upon which the letter D appears in red. The push button 65 is used for plate voltage on the 120 volt scale, and the push button 66 for plate voltage on the 300 volt scale, and the meter is normally connected for measurement on the 600 volt scale.

The panel of the remote control box 24 bears appropriate indicia for indicating the function of these buttons, and it should be noted that the meter is protected by being normally connected for the measurement of high voltages, so that the meter will not be damaged when a high voltage is impressed upon it. The push buttons should only be pressed when the indication on the high voltage range is such as to indicate to the operator that the voltage is not too high for the lower range.

The next two push buttons 67 and 68 are black in color, and they control the connection of the grid in the case of a control grid for screen grid tubes or the normal grid of ordinary tubes for the grid test described in my prior application.

By reference to the circuit diagram of Fig. 7, it will be noted that the pressing of the push button 67 changes the connection of the control grid from a point in the circuit where the control grid receives a negative bias to a spaced point in the circuit where the control grid receives positive bias. This change in voltage on the grid results in a corresponding change in the plate current, which is read on the meter F and is an indication of the worth of the tube.

The first push buttons 69 and 70 in the next column are utilized for measuring the cathode voltage on the meter E (32), and the connections to the switches controlled by push buttons 69 and 70 are such that push button 69 connects meter E for measurement of positive cathode voltages on the 60 volt scale, and the switches controlled by push button 70 are for measurement of negative cathode voltages on the 60 volt scale.

The next three push buttons in the second column, numbered 71, 72 and 73, are green in color, corresponding to the green letter E on meter 32, and they control switches for the measurement of grid voltages, the button 71 being for positive grid voltages on the 120 volt scale, the button 72 for negative grid voltages on the 120 volt scale, and the button 73 for negative grid voltages on the 30 volt scale. This arrangement of scales and push buttons gives accurate measurement of the grid voltages which are used on most commercial tubes.

The next push button 74 is green in color, corresponding to the green letter E on the meter 32, and it controls a switch for connecting the meter E to measure screen grid current on the 6 milliampere scale of meter E.

The first three push buttons 75, 76, 77 in the third column are yellow in color, corresponding to the yellow letter C on A. C. voltmeter 30, and they are utilized for the measurement of alternating current filament voltages on the scales 0–4, 0–8, and 0–16 volts.

The next two push buttons 78, 79 are orange in color, corresponding to the orange letter G on the meter 34, and they control switches for the measurement of direct current filament voltages. The push button 78 connects the meter G to measure positive D. C. filament voltages on the 6 volt scale. These connections are reversed by push button 79 for filaments which are connected in the opposite direction.

The next push button 80 is also orange in color, and is for use in measurement of control grid voltages on the 6 volt scale of meter G. The last push button, 81, is orange and bears the indicia "Low Res." and is used for measuring low resistances on the meter G, which may be utilized for giving direct resistance measurements when the resistance to be measured is properly connected in circuit with the standard battery by means of the binding posts W and X.

Before proceeding with the description of the apparatus necessary for these resistance tests, it should be noted that the remote control box 24 is also preferably provided with binding posts permitting the use of each of the meters C to G separately, and the binding posts provided for this purpose have been given the letters Q to Z, inclusive. This merely involves the connecting of appropriate binding posts with appropriate ranges of the meters, and the binding posts have been given corresponding numerals on the wiring diagram of Fig. 7. The panel of the remote control box also bears appropriate indicia between each of the binding posts, showing the measurements which may be taken by the use of those binding posts.

The binding posts W and X are used for continuity tests and for resistance tests, because they are connected in circuit with the standard battery 82 (Fig. 7), which may consist of an ordinary 4½ 3 cell dry C battery located in the remote control box and connected as shown in Fig. 7.

When it is desired to measure the electrical resistance of any electrical unit, the unit may be connected to the binding posts W and X, and by tracing the circuit of Fig. 7, it will be found that this places the resistance in series with the standard cell 82 and the milliammeter G (34). The amount of current which flows through the resistance under measurement, depends upon the electromotive force impressed and the resistance of the unit. The electromotive force being constant at 4½ volts or any other standard value, the meter G may be calibrated directly in terms of resistance, and two resistance scales 0–1000 and 0–50,000 ohms have been provided on meter G. The resistance varies inversely with the amount of current, and consequently the resistance scales on meter G run in the opposite direction from the volt scales. The push button 81, which is used for the low resistance within the range of 0 to 1000 ohms, shunts the meter 34 across an additional resistance 83.

It should be noted that the resistance meter G may be calibrated by taking into consideration the resistance of the meter so that this resistance meter is adapted to give more accurate results than can be secured by calculations where the resistance of the meter is not taken into consideration.

The remote control box 24 includes all of the switches, circuits and resistances for associating the meters 30—34 and the sockets 60, 61 with the receiving set through cable 25 and test plug 23, so that the tube removed from the set may be placed in either of the sockets 60, 61, and the receiving set operated with the tube in the remote control box. The measurements may thus be effected with the receiver either in open circuit by removing the tube from the socket, or under normal operating conditions or maximum volume, and the electrical conditions within the set under operation may be tabulated as described in my prior application, and the exact condition of the set determined.

The test connector 23 is preferably a five-prong connector having male contacts corresponding to the prongs of a five-prong tube, and whenever it is necessary to make a connection with a four-hole socket, an appropriate adapter is utilized which merely connects the cathode prong to one side of the filament.

In order to provide for the test of sets having screen grid tubes, the cable 25 preferably includes an auxiliary lead 84 having a connector 85 for connection to the circuit of the receiving set, in the same manner as the connector at the top of the screen grid tube. The remote control box 24 is also provided with an appropriate lead 86 having a female screen grid connector 87, which may be connected to the control grid of the screen grid tube when the tube is placed in the socket of the remote control box 24. The plug 88 appearing on the panel of the box 24 is merely a dead connector plug utilized for holding the screen grid lead and connector 86, 87 when this lead is not in use.

The cable 27 leading from the remote control box to the panel 26 includes a multiplicity of conductors or leads as shown in Fig. 7, connected to the switches of the remote control box 24, and to the proper terminals of the instruments C—G. In the present embodiment, the cable 27 includes twelve leads and is consequently provided with a connector plug 89 having a similar number of female contacts 90. The connector plug 89 consists of a body of molded insulating material, such as a phenolic condensation compound, and it is adapted to cooperate with the male connector plug 37 carried by panel 26. The male connector plug 37 is preferably provided with a metallic guide stud 91 adapted to be slidably received in a metal tube or guide 92 carried by plug 89, and the male contacts 93 are also twelve in number and symmetrically arranged about the stud 91 to engage in the apertures 94 at the end of each of the female contacts 95.

The stud 91 preferably projects above the male contacts 93 so that the plug 89 may first be located in proper position on the stud 91, and the panel is preferably provided with an auxiliary pin 96 adapted to be received in a semi-circular groove 97 formed in the plug 89. The plug 89 having been located on stud 91, it may be rotated until groove 97 registers with pin 96, at which time the contacts 93 and 95 register and the plug 89 may then be pushed down to produce the proper connections between the conductors of cable 27 and the instruments 30—34. The provision of means for assuring the proper connection of these instruments is very important, as otherwise the instruments would be irreparably damaged.

Referring to Figs. 3 and 4, these are full-sized plan views of the meters B (29) and G (34), respectively. The meter B has a scale bearing the indicia "Open" at the left end of the scale, and an indication at this point means that the condenser circuit is open, while the opposite end of the scale bears the indicia "Short", indicating that the condenser is short-circuited at this reading.

The resistance of the meter B is preferably such that it will measure the short-circuit voltage of the potential impressed upon the capacity to be measured, and the meter B is preferably calibrated to indicate capacity when a voltage of 115 volts and frequency of 60 cycles is impressed on the condenser. For rough measurements, the capacity may be calculated readily for 50 cycles at five-sixths of that indicated; for 40 cycles, one-half; and for 25 cycles, five-twelfths.

The other meters are merely standard electrical meters having the usual scales, and therefore are not illustrated in detail.

Figure 5:
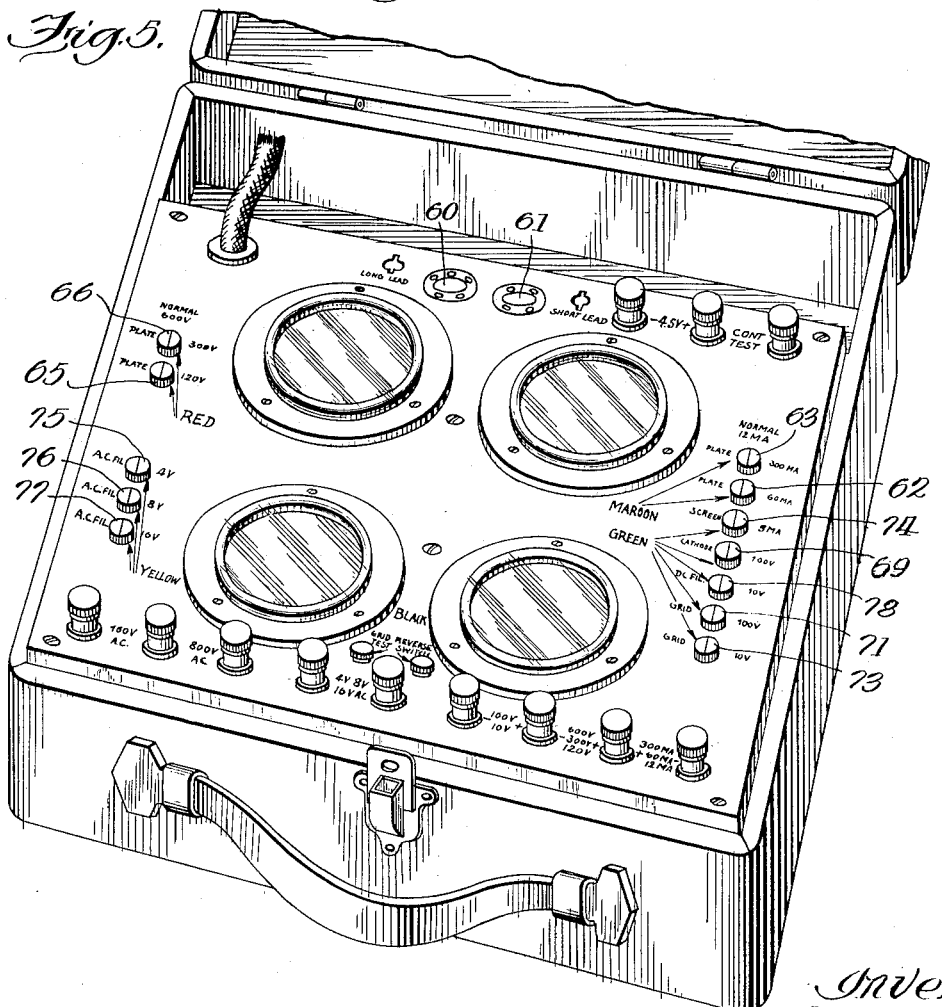
Fig. 5 is a view in perspective of another form of the apparatus, illustrating the use of the colored push button switching arrangement in a portable radio set tester.

Referring to Fig. 5, this is a view in perspective of a portable instrument utilizing the same color scheme arrangement on the push buttons. The push buttons have been given numbers corresponding to the same push buttons, and the instrument numerals corresponding to the instruments of Figs. 1 and 2.

Referring to Figs. 6 and 7, the present testing apparatus preferably includes means for preventing oscillation in the receiving set under test. When apparatus of the present type is connected up with certain types of receiving sets, it is found that there is marked tendency toward oscillation in the set, and it is found that the oscillation may be prevented by the inclusion of a condenser between the cathode and grid leads.

The condenser should preferably be of relatively low capacity, and the exact value can best be determined in any case by the use of a variable condenser until the appropriate value has been found. For the present purposes, a condenser of 0.1 microfarad is found to be very efficacious in preventing oscillation, and the condenser 98 shown in Fig. 7 performs this function. It is not always necessary or desirable to utilize this condenser, and therefore the condenser 98 is preferably made a part of a special adapter 99 having five holes 100 and five prongs 101. The casing 102 is suitably elongated to make room for the condenser 98 and the condenser 98 is enclosed within the casing of adapter 99, being connected across from the cathode to the grid lead. This condenser is believed to operate by effectually absorbing the oscillations before they reach any large amplitude, and the oscillations are thereby prevented from interfering with the tests carried on by the apparatus.

Fig. 11 is an exemplary circuit diagram in which it will be found that the adapter 99 is very useful in preventing oscillations. As this is merely one of the standard circuits, it will not be described in detail, but may be considered a part of the complete circuit of the testing apparatus when the condenser adapter and circuit of Fig. 7 is utilized.

The present apparatus is capable of carrying on many more testing operations than the portable apparatus shown in my prior application, for the reason that the laboratory type apparatus may be made more comprehensive and the instruments more sensitive, and the present apparatus is capable of directly measuring capacity and resistance.

Furthermore, the instruments may be controlled by the operator without the necessity to approach the bench and panel for each test, and the remote control box enables the location of the tubes much closer to the receiving set, thereby eliminating long leads which would otherwise be interposed between the tube and receiving set if the sockets were located on the panel. The sockets may also be located to hold the tube in upright position, whereas the meters are placed vertically. The present apparatus is capable of determining the condition of the receiving set, as well as the condition of the individual tubes, and that of all the component parts of any audion tube circuit.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a radio testing apparatus, the combination of an amplifying circuit with a testing device, comprising a plurality of conductors connected with the terminals of one of the sockets of the audion tube circuit, electrical measuring instruments associated with said conductors and adapted to indicate electrical conditions at said socket, and a condenser connected across predetermined contacts of said socket and adapted to prevent oscillation of said audion tube circuit while said electrical instruments are connected in circuit with the audion tube circuit.

2. In a radio testing apparatus, the combination of an amplifying circuit with a testing device, comprising a plurality of conductors connected with the terminals of one of the sockets of the audion tube circuit, electrical measuring instruments associated with said conductors and adapted to indicate electrical conditions at said socket, and a condenser connected across predetermined contacts of said socket and adapted to prevent oscillation of said audion tube circuit while said electrical instruments are connected in circuit with the audion tube circuit, said condenser being connected between cathode and grid contacts of said socket to absorb oscillations generated in said circuits.

3. The combination with a radio receiver, of a testing apparatus, a plurality of contacts adapted to be connected to the terminals associated with a tube socket of a radio receiver, a plurality of conductors extending from said contacts to a radio tube socket in said testing apparatus, and a condenser associated with said conductors bridged across an operative circuit of said radio receiver to maintain stability of the radio receiver circuits in the course of the testing thereof.

4. The combination with a radio receiver, of a testing apparatus, a plurality of contacts adapted to be connected to the terminals associated with a tube socket of a radio receiver, an input circuit for the radio energy connected to said socket, a plurality of conductors extending from said contacts to a radio tube socket in said testing apparatus, two of said conductors leading away the terminals of said input circuit to said testing apparatus, and a condenser bridged across said two conductors to maintain stability of the radio receiver circuits in the course of testing thereof.

5. In a radio testing apparatus, the combination of testing means adapted to indicate the predetermined electrical conditions in certain of the circuits of a radio receiver, with a plurality of conductors for connecting said testing apparatus to a radio receiver, and a condenser associated with said conductors and bridged across an operative circuit of said radio receiver to maintain stability of the radio receiver circuits in the course of the testing thereof.

6. In a testing apparatus for thermionic tubes, an adapter comprising an insulating body provided with a plurality of male contacts corresponding to the prongs of a thermionic tube, a plurality of female contacts adapted to engage the prongs of a thermionic tube of predetermined type, certain of said male contacts being connected to certain of said female contacts by electrical conductors, and a condenser associated with predetermined of said conductors and adapted to be bridged across an operative circuit of a radio receiver including said adapter to maintain stability of the radio receiver circuits in the course of the testing thereof.

JOHN H. MILLER.